(12) United States Patent
Suzuki et al.

(10) Patent No.: US 11,893,429 B2
(45) Date of Patent: Feb. 6, 2024

(54) COLORIMETRIC DEVICE, IMAGE FORMING APPARATUS, AND CALIBRATION METHOD

(71) Applicants: Rie Suzuki, Kanagawa (JP); Tatsuya Ishii, Kanagawa (JP)

(72) Inventors: Rie Suzuki, Kanagawa (JP); Tatsuya Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/320,539

(22) Filed: May 19, 2023

(65) Prior Publication Data

US 2023/0401405 A1    Dec. 14, 2023

(30) Foreign Application Priority Data

Jun. 13, 2022 (JP) .................. 2022-095180

(51) Int. Cl.
*G06K 15/02* (2006.01)
*B41J 2/21* (2006.01)
*G01N 21/25* (2006.01)
*G03G 15/01* (2006.01)

(52) U.S. Cl.
CPC .......... *G06K 15/027* (2013.01); *B41J 2/2103* (2013.01); *G01N 21/251* (2013.01); *G03G 15/0105* (2013.01); *G01N 2201/127* (2013.01)

(58) Field of Classification Search
CPC ... G06K 15/027; B41J 2/2103; G01N 21/251; G01N 2201/127; G03G 15/0105
See application file for complete search history.

(56) References Cited

U.S. PATENT DOCUMENTS

| | | | |
|---|---|---|---|
| 4,699,510 A | 10/1987 | Alguard | |
| 5,642,189 A | 6/1997 | Alguard | |
| 2008/0174763 A1 | 7/2008 | Ehbets et al. | |
| 2013/0258366 A1* | 10/2013 | Miyazaki | G01N 21/89 358/1.9 |

(Continued)

FOREIGN PATENT DOCUMENTS

| | | |
|---|---|---|
| DE | 3586961 | 4/1993 |
| JP | 2010-190785 | 9/2010 |
| JP | 5424660 | 2/2014 |

(Continued)

OTHER PUBLICATIONS

Extended European Search Report for 23178685.6 dated Nov. 7, 2023.

*Primary Examiner* — Quang N Vo
(74) *Attorney, Agent, or Firm* — IPUSA, PLLC (57) ABSTRACT

A colorimetric device includes: a white reference portion having: a first irradiation area; and a second irradiation area different from the first irradiation area; a light emitter including: a first light source configured to emit visible light to the first irradiation area; and a second light source configured to emit ultraviolet light to the second irradiation area; a sensor configured to detect the visible light reflected from the first irradiation area and the ultraviolet light reflected from the second irradiation area; and a processor configured to: measure colorimetric information of an object; and calibrate the colorimetric information of the object based on the visible light and the ultraviolet light detected by the sensor.

8 Claims, 10 Drawing Sheets

(56) References Cited

U.S. PATENT DOCUMENTS

2015/0110674 A1\* 4/2015 Kimura ............ G01N 35/00693
   422/67
2020/0007694 A1  1/2020 Kubota et al.

FOREIGN PATENT DOCUMENTS

| JP | 2019-144020 | 8/2019 |
| JP | 2020-003419 | 1/2020 |
| JP | 2021-181904 | 11/2021 |

\* cited by examiner

COLORIMETRIC DEVICE, IMAGE FORMING APPARATUS, AND CALIBRATION METHOD

CROSS-REFERENCE TO RELATED APPLICATIONS

This patent application is based on and claims priority pursuant to 35 U.S.C. § 119(a) to Japanese Patent Application No. 2022-095180, filed on Jun. 13, 2022, in the Japan Patent Office, the entire disclosure of which is hereby incorporated by reference herein.

BACKGROUND

Technical Field

Embodiments of the present disclosure relate to a colorimetric device, an image forming apparatus, and a calibration method performed by the colorimetric device.

Related Art

A colorimetric device for outputting colorimetric information on a color image formed on a recording medium has been developed to enhance the reproducibility of color images formed on recording media by image forming apparatuses.

SUMMARY

An embodiment of the present disclosure provides a colorimetric device includes: a white reference portion having: a first irradiation area; and a second irradiation area different from the first irradiation area; a light emitter including: a first light source configured to emit visible light to the first irradiation area; and a second light source configured to emit ultraviolet light to the second irradiation area; a sensor configured to detect the visible light reflected from the first irradiation area and the ultraviolet light reflected from the second irradiation area; and a processor configured to: measure colorimetric information of an object; and calibrate the colorimetric information of the object based on the visible light and the ultraviolet light detected by the sensor.

Another embodiment of the present disclosure provides a calibration method performed by a colorimetric device includes: emitting visible light to a first irradiation area of a white reference portion; emitting ultraviolet light to a second irradiation area of the white reference portion, the second irradiation area different from the first irradiation area; detecting the visible light reflected from the first irradiation area; detecting the ultraviolet light reflected from the second irradiation area; calibrating colorimetric information of an object based on the visible light and the ultraviolet light after the detecting the visible light and the detecting the ultraviolet light; and measuring the colorimetric information of an object after the calibrating.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

Embodiments of the present disclosure reduce or prevent a reduction in the calibration accuracy of the colorimetric device.

Hereinafter, an embodiment of the present invention will be described with reference to the drawings. In each figure, the same reference numerals are given to the same constituent parts, and redundant explanations may be omitted in some cases. Among the directions indicated by the arrows in the drawings, the X-axis direction indicates a conveyance direction of a color-information detection unit described later. The Y-axis direction indicates the arrangement direction of the spectroscopic sensors in the spectroscopic unit. Further, the Z-axis direction indicates a direction orthogonal to the XY plane.

First Embodiment

A colorimetric device 10 according to the first embodiment is described.

Overall Configuration Example of Colorimetric Device 10

Figure 1:
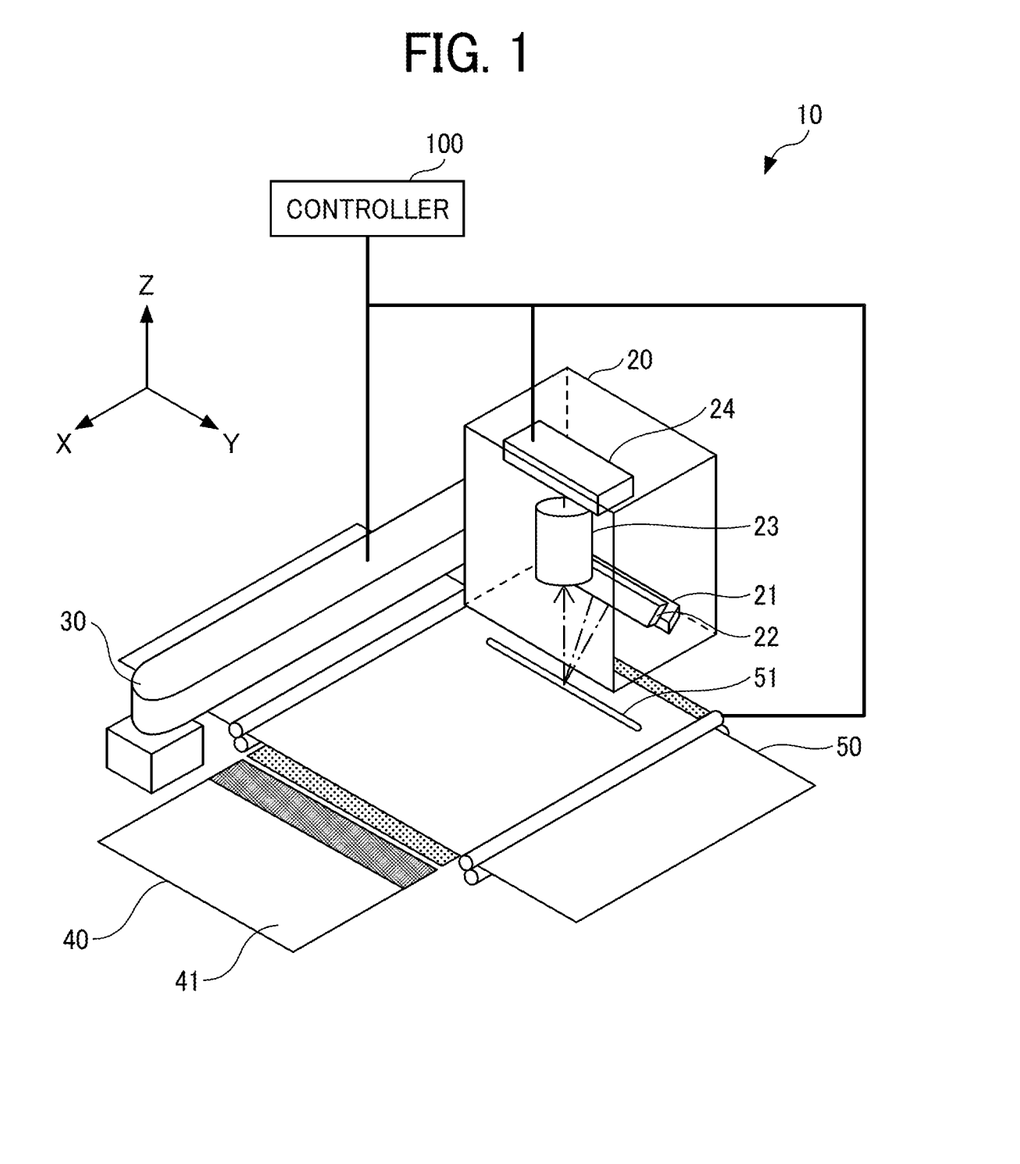
FIG. 1 is an illustration of the configuration of a colorimetric device according to an embodiment of the present disclosure.
Figure 2:
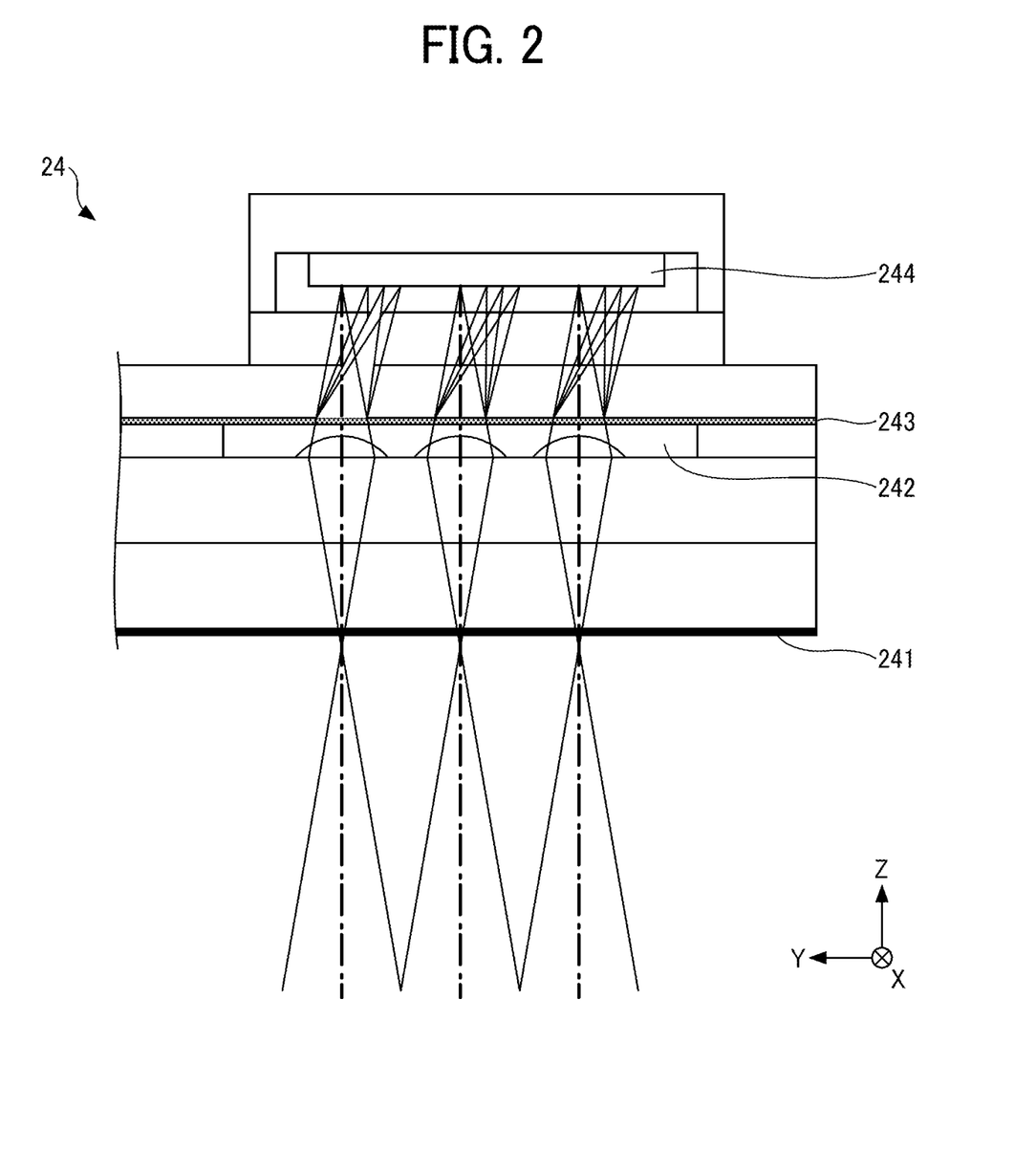
FIG. 2 is a schematic view of a cross section parallel to an XZ plane of a spectroscopic unit of the colorimetric device in FIG. 1.

Initially with reference to FIGS. 1 and 2, a description is given of the colorimetric device 10 according to an embodiment of the present disclosure. FIG. 1 is an illustration of the configuration of the colorimetric device 10 according to an embodiment of the present disclosure. FIG. 2 is a schematic view of a cross section parallel to the XZ plane of a spectroscopic unit 24 of the colorimetric device 10 in FIG. 1.

As illustrated in FIG. 1, the colorimetric device 10 of the present embodiment includes a color-information detection unit 20, a color-information detector conveyor 30 (hereinafter simply referred to as a conveyor 30), a calibration reference portion 40, and a controller 100.

The color-information detection unit 20 is, for example, an optical unit for detecting color information of an object to be measured, from light reflected off the object. More specifically, the color-information detection unit 20 of the present embodiment includes a first linear light source 21, a second linear light source 22, a reduction imaging lens 23, and a spectroscopic unit 24 (as a sensor to detect the visible light reflected from a first irradiation area (411) and the ultraviolet light reflected from a second irradiation area (412)). Examples of the object to be measured include the calibration reference portion 40, a color chart 50, and paper. The first linear light source 21 and the second linear light source 22 are examples of a light emitter. The spectroscopic unit 24 is an example of a light receiver.

The first linear light source 21 is an array of white light-emitting diodes (LEDs) that have radiation intensity for about the entire range of visible light. However, no limitation is intended thereby, and a fluorescent lamp or a lamp light source such as a cold-cathode tube may be used as the first linear light source 21. The first linear light source 21 is an example of a first light source.

In at least one example, the first linear light source 21 emits light in a wavelength range for spectral separation, with a uniform intensity over the entire spectral range. A collimator lens that concentrates the light emitted from the first linear light source 21 and irradiates a detection area 51 with parallel light or converging light may additionally be arranged around such the first linear light source 21.

The second linear light source 22 is an LED array capable of emitting ultraviolet light. However, no limitation is intended thereby, and an ultraviolet lamp light source may be used as the second linear light source 22. The second linear light source 22 is an example of a second light source.

The reduction imaging lens 23 is disposed such that the optical axis thereof is coincident with a normal to the detection area 51, and has a function to form an image of the light beam reflected by the detection area 51 on the incident plane of the spectroscopic unit 24 with a prescribed magnifying power. The reduction imaging lens 23 is composed of multiple lenses. By adding the image-side telecentric characteristics to the reduction imaging lens 23, the chief ray of the light flux incident on the imaging plane can easily be made approximately parallel to the optical axis.

The spectroscopic unit 24 separates, into different colors, light rays diffused and reflected from the object after being emitted from the first linear light source 21 and the second linear light source 22 to the object, and outputs electrical signals (i.e., information about the separated and received light rays) according to the separated and received light rays to the controller 100. In addition, the spectroscopic unit 24 outputs electric signals according to the separated light rays received at multiple positions in the Y-axis direction within the detection area 51.

More specifically, as illustrated in FIG. 2, the spectroscopic unit 24 includes a pinhole array 241, a lens array 242, a diffraction element 243, and an image sensor 244.

The pinhole array 241 has multiple pinholes that serve as openings through which the light reflected from the object passes. The multiple pinholes according to the present embodiment are arranged in the Z-axis direction on the imaging plane where the image of the light incident from the reduction imaging lens 23 is formed, and are arrayed at equal distances in the Y-axis direction. FIG. 2 illustrates an embodiment in which three pinholes are arranged in the Y-axis direction. However, no limitation is intended thereby, and a slit array with multiple rectangular openings or an oblique slit array in which multiple rectangular slits are inclined with respect to the Y-axis direction may be adopted in place of the pinhole array 241.

The light flux reflected from the object is extracted by each pinhole of the pinhole array 241. Each one of the multiple lenses (e.g., three lenses arranged in the Y-axis direction in FIG. 2) of the lens array 242 concentrates the light flux that has passed through a corresponding pinhole of the multiple pinholes of the pinhole array 241 onto the image sensor 244 to form an image on the image sensor 244.

Further, a diffraction element 243 is provided at a position facing the lens array 242. The light fluxes that have passed through the multiple lenses of the lens array 242 are spectrally separated by the diffraction element 243.

On the image sensor 244, multiple diffraction patterns that correspond to the light fluxes are formed.

As the diffraction element 243 according to the present embodiment, it is desired that blazed grating whose diffraction efficiency of the primary diffracted light is enhanced be used. Using a blazed grating as the diffraction element 243 enhances the diffraction efficiency of the primary diffracted light and the light utilization efficiency of the optical system.

The image sensor 244 is a line sensor in which multiple pixels are arranged in the Y-axis direction. The image sensor 244 uses multiple light-receiving elements arranged at different positions to receive the light beams of the multiple diffraction patterns formed by the lens array 242 and the diffraction element 243 and acquire the light intensity, or the amount of light, for each wavelength of the received light beams. The image sensor 244 is, for example, a metal oxide semiconductor (MOS), a complementary metal oxide semiconductor (CMOS), or a charge-coupled device (CCD).

One of the multiple pinholes of the pinhole array 241, one of the multiple lenses of the lens array 242 that corresponds to the above one pinhole, a portion of the diffraction element 243 through which the light flux from the above lens passes, and a portion of the rows of pixels of the image sensor 244 together serve as one optical spectroscope. Accordingly, a portion that has the function of one spectroscope may be referred to as a spectral sensor in the following description.

Although FIG. 2 illustrates an example in which three spectroscopic sensors are arranged, the present invention is not limited to this, and more spectroscopic sensors may be arranged. For example, when the image sensor 244 has 1024 pixels with the number of pixels in the portion of the rows of pixels set to ten, 102 spectral sensors can be configured.

The calibration reference portion 40 includes a white reference plate 41. Examples of the white reference plate 41 include a plate-shaped member made of polytetrafluoroethylene. The white reference plate 41 has typical reflection characteristics, which result from the irradiation of visible light emitted from a visible light source (e.g., the first linear light source 21). The white reference plate 41 is an example of a white reference portion.

In the present embodiment, the colorimetric device 10 uses a white reference plate (also referred to as a white calibration plate) that has typical reflection characteristics to perform the calibration of the colorimetric device 10. In the colorimetric device 10 according to the present embodiment, the second linear light source 22 emits ultraviolet light to the white reference plate 41 to perform calibration with ultraviolet light. Furthermore, the colorimetric device 10 of the present embodiment may be calibrated using both the visible light from the first linear light source 21 and the ultraviolet light from the second linear light source 22.

The controller 100 controls, for example, the operation and conveyance of the color-information detection unit 20. A hardware configuration and a functional configuration of the controller 100 will be separately described in detail with reference to FIGS. 3 and 4.

Configuration of Controller 100

Figure 3:
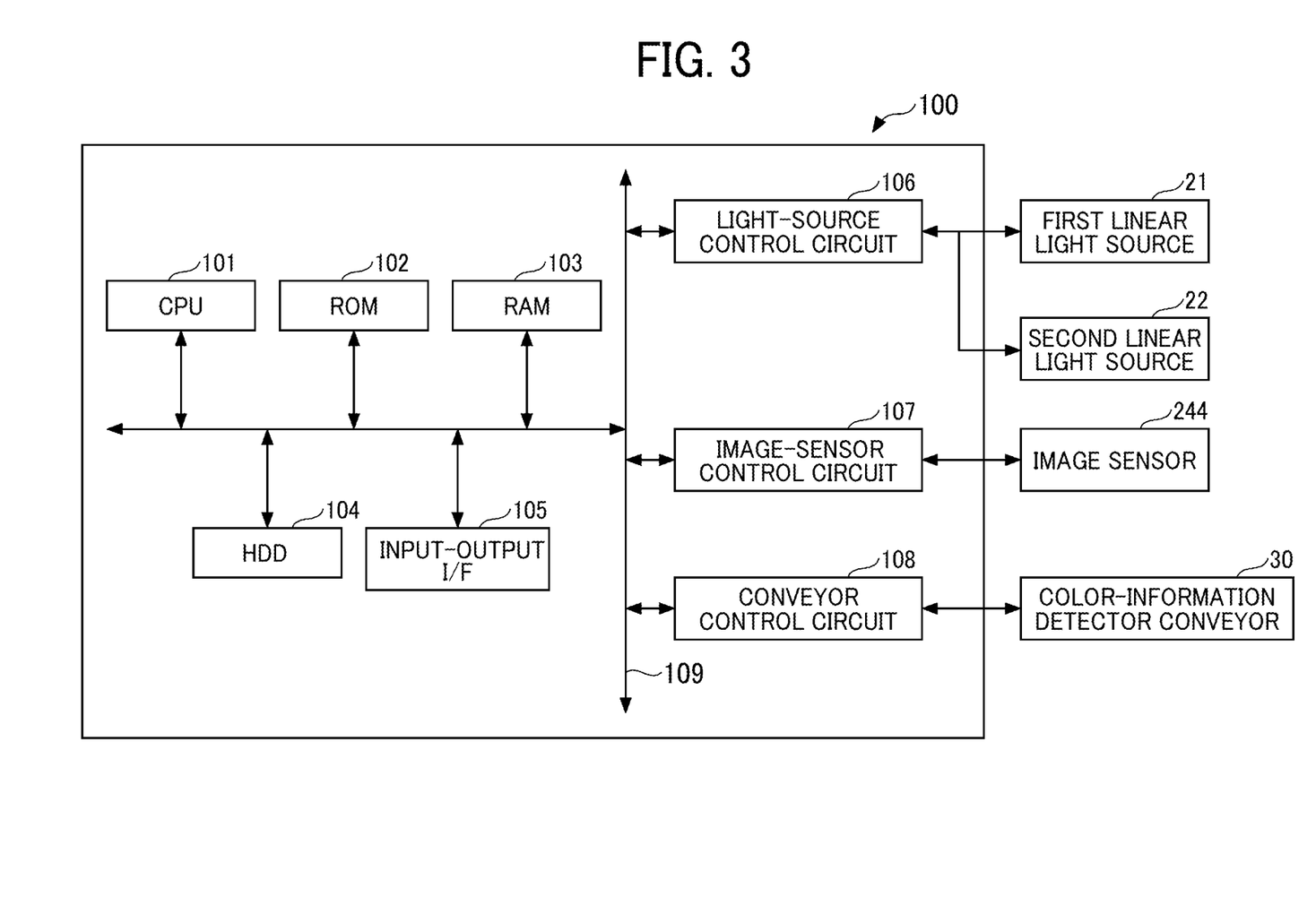
FIG. 3 is a block diagram of a hardware configuration of a controller of the colorimetric device in FIG. 1.
Figure 4:
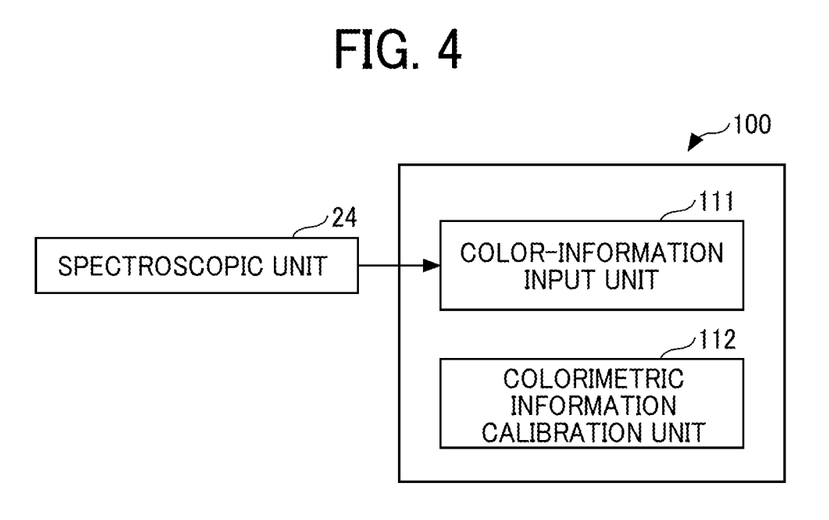
FIG. 4 is a functional block diagram of the controller in FIG. 3.

A hardware configuration of the controller 100 will be described with reference to FIGS. 3 and 4. FIG. 3 is a block diagram of the hardware configuration of the controller 100 according to an embodiment of the present disclosure. FIG. 4 is a functional block diagram of the controller 100. The controller 100 according to the present embodiment may be implemented by a general-purpose computer.

As illustrated in FIG. 3, the controller 100 includes a central processing unit (CPU) 101, a read only memory (ROM) 102, a random access memory (RAM) 103, a hard disk drive (HDD) 104, an input-output interface (UF) 105, a light-source control circuit 106, an image-sensor control circuit 107, and a conveyor control circuit 108. These components are electrically connected to each other via a system bus 109.

The CPU 101 reads out a program or date from a storage device such as the ROM 102 or the HDD 104 onto the RAM 103, and executes a predetermined process defined by the program. Thus, control of the entire controller 100 and various functions to be described later are implemented. Note that the hardware configuration of the controller 100 is not limited to that described above, and some or all of the functions of the controller 100 may be implemented by one or more processing circuits. The processing circuit includes an electronic circuit such as the above-described CPU, an application specific integrated circuit (ASIC), or a field-programmable gate array (FPGA), and a device such as a typical circuit module.

The ROM 102 is a non-volatile memory (storage device). The ROM 102 stores programs and data of, for example, a basic input/output system (BIOS) and an operating system (OS) that are executed when the colorimetric device 10 is activated. The RAM 103 is a volatile semiconductor memory (storage device) that temporarily stores a program and data.

The HDD 104 is a non-volatile magnetic storage device that stores a program for executing various processes by the controller 100. The HDD 104 may be a semiconductor storage such as a solid-state drive (SSD).

The input-output OF 105 is various interfaces connected to an external device to communicate data with the external device. For example, the spectral information of the light reflected by the white reference plate 41 detected by the color-information detection unit 20 may be input to the controller 100 via the input-output OF 105.

The light-source control circuit 106 is an electric circuit for outputting a predetermined control signal to control operations of the first linear light source 21 and the second linear light source 22. The image-sensor control circuit 107 is an electric circuit for outputting a predetermined control signal to control the operation of the image sensor 244.

The electric signal from the image sensor 244 is transmitted to the RAM 103 or the HDD 104 and stored therein.

The conveyor control circuit 108 is an electric circuit for controlling the operation of the conveyor 30. More specifically, the conveyor control circuit 108 outputs a predetermined control signal to control a driving source such as a motor provided in the conveyor 30.

The controller 100 having such a hardware configuration has the following functions. As illustrated in FIG. 4, the controller 100 includes a color-information input unit 111 and a colorimetric information calibration unit 112. The function of the color-information input unit 111 is implemented by, for example, the input-output OF 105 of the controller 100. The function of the colorimetric information calibration unit 112 is implemented by, for example, the CPU 101 of the controller 100. The colorimetric information calibration unit 112 is an example of a processor.

The color-information input unit 111 receives, from the spectroscopic unit 24, color information for light reflected by the white reference plate 41 and detected by N pixels constituting one spectroscopic sensor of the spectroscopic unit 24. The color information includes, for example, the amount of light for each wavelength received by said one spectroscopic sensor. The detected color information is output to the colorimetric information calibration unit 112.

Subsequently, the colorimetric information calibration unit 112 calibrates colorimetric information (for example, data regarding the amount of light for each wavelength received by the spectroscopic sensor) obtained from light reflected off the color chart 50 and another object to be measured, using the received color information. A calibration method involves, for example, dividing the amount of light received in a particular wavelength band in the colorimetric information of the object by the amount of light received in the same wavelength band in the color information of the white reference plate 41. The same processing is performed in the entire measured wavelength range. The colorimetric information from the object such as the color chart 50 is obtained, for example, before or after the color information of the white reference plate 41 is detected.

The colorimetric device 10 according to an embodiment includes a white reference portion according to an embodiment having a first irradiation area 411 and a second irradiation area 412 different from the first irradiation area 411; a light emitter; a sensor (the spectroscopic unit 24); and the controller (circuitry or a processor). The light emitter includes a first light source to emit visible light to the first irradiation area and a second light source to emit ultraviolet light to the second irradiation area. The sensor detects the visible light reflected from the first irradiation area and the ultraviolet light reflected from the second irradiation area. The controller measures colorimetric information of an object and calibrate the colorimetric information of the object based on the visible light and the ultraviolet light detected by the sensor.

A calibration method performed by such a colorimetric device includes: emitting visible light to a first irradiation area of a white reference portion by a first light source of a light emitter; emitting ultraviolet light to a second irradiation area of the white reference portion by a second light source of the light emitter, the second irradiation area different from the first irradiation area; detecting the visible light reflected from the first irradiation area (411) and the ultraviolet light reflected from the second irradiation area (412) by a sensor; measuring colorimetric information of an object; and calibrating the colorimetric information of the object based on the visible light and the ultraviolet light detected by the sensor.

Calibration Operation of Colorimetric Device 10 Using White Reference Plate 41

With reference to FIGS. 5A, 5B, 6A, 6B, and 7, a description is given of a calibration operation example of the colorimetric device 10 using the white reference plate 41. FIGS. 5A, 6A, 6B, and 7 are schematic views of an end face of the colorimetric device 10 according to the first embodiment, the end face being parallel to the XZ plane.

Figure 5A:
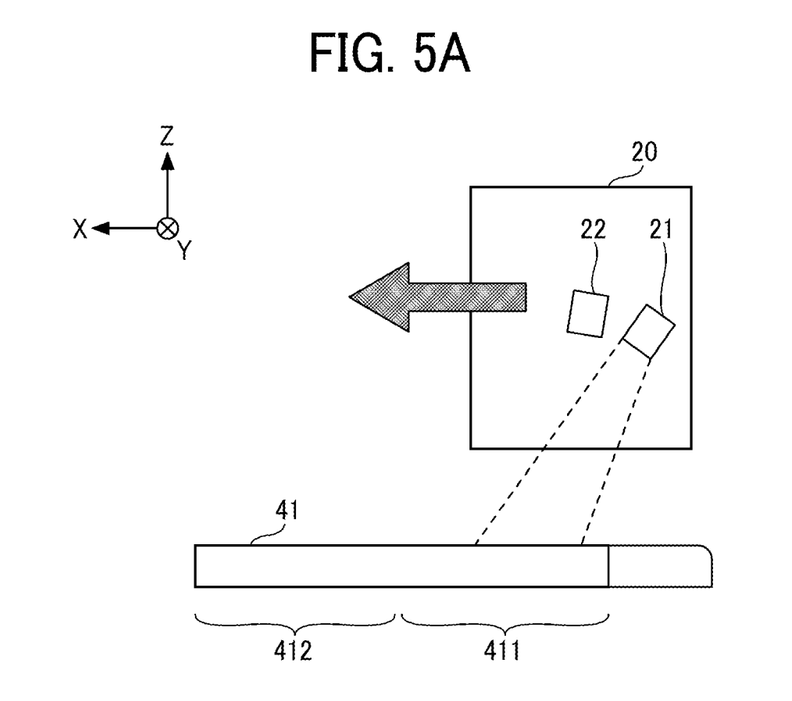
FIGS. 5A and 5B are schematic views of an end face parallel to the XZ plane of a colorimetric device according to a first embodiment.

In the colorimetric device 10 that performs calibration as pre-processing for colorimetry on an object to be measured (e.g., the color chart 50 as illustrated in FIG. 1), the first linear light source 21 emits visible light to the white reference plate 41 in the pre-processing. In such a pre-processing, the color-information detection unit 20 is first moved by the conveyor 30 to a position in or close to an area 411, as illustrated in FIG. 5A. Then, the first linear light source 21 is driven to emit visible light to the area 411 of the white reference plate 41. The area 411 is also referred to as a first irradiation area 411.

Figure 5B:
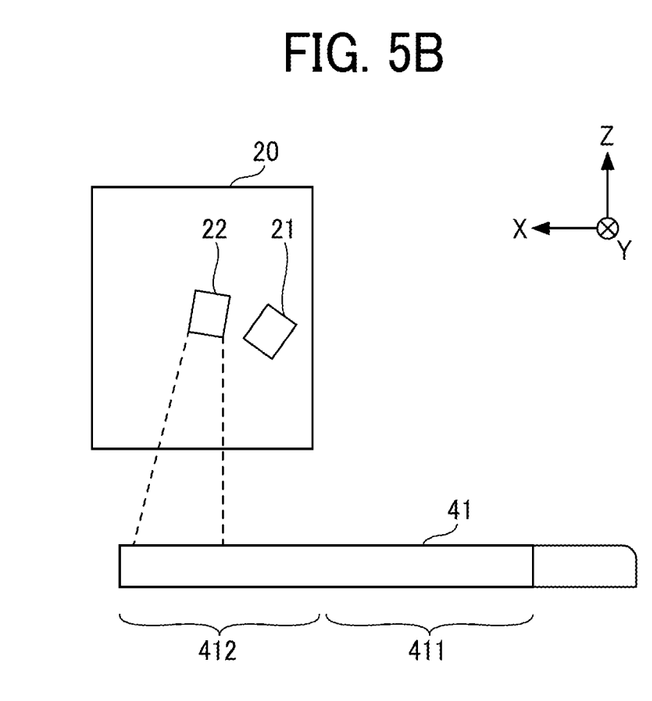

In some cases, the colorimetric device 10 might emit ultraviolet light to an object to be measured so as to observe fluorescence of a sheet containing a fluorescent substance (for example, a fluorescent whitening agent). In calibration as pre-processing of such cases, e.g., adjustment of the degree of currents applied to the second linear light source 22 and a lighting time of the second linear light source 22, the second linear light source 22 of the colorimetric device 10 emits ultraviolet light to the white reference plate 41. In such a pre-processing, the color-information detection unit 20 is moved forward in the X-axis direction (i.e., the +X-axis direction indicated by arrow in FIG. 5B) by the conveyor 30 more than in the case of emitting visible light to the white reference plate 41, so that the color-information detection unit 20 is positioned in or close to an area 412 as illustrated in FIG. 5B. Then, the second linear light source 22 is driven to emit ultraviolet light to the area 412 of the white reference plate 41. The area 412 is also referred to as a second irradiation area 412. The area 412 may be irradiated with visible light. In other words, in some embodiments, the first linear light source 21 emits visible light to the second irradiation area 412.

The colorimetric device 10 of the present embodiment emits visible light to the first irradiation area 411 of the white reference plate 41 when calibrated with visible light, whereas the colorimetric device 10 of the present embodiment emits ultraviolet light to the second irradiation area 412 different from the first irradiation area 411 when calibrated with ultraviolet light.

This configuration enables calibration with visible light based on light reflected from an area (i.e., the first irradiation area 411) different from a deteriorated area caused by being exposed to ultraviolet light. In other words, such a configuration enables calibration with visible light irrespective of a partial deterioration of the white reference plate 41 due to the exposure to ultraviolet light, and thus reduces or prevents a reduction in the calibration accuracy due to the deterioration of the white reference plate 41. As a result, a reduction in the calibration accuracy of the colorimetric device 10 is reduced or prevented.

Figure 6A:
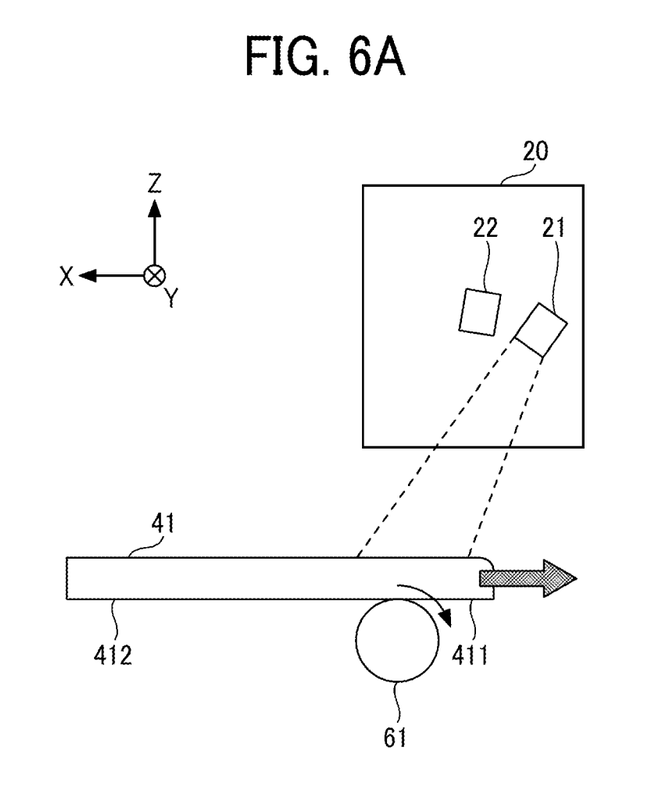
FIGS. 6A and 6B are schematic views of an end face parallel to the XZ plane of a colorimetric device according to the first embodiment.
Figure 6B:
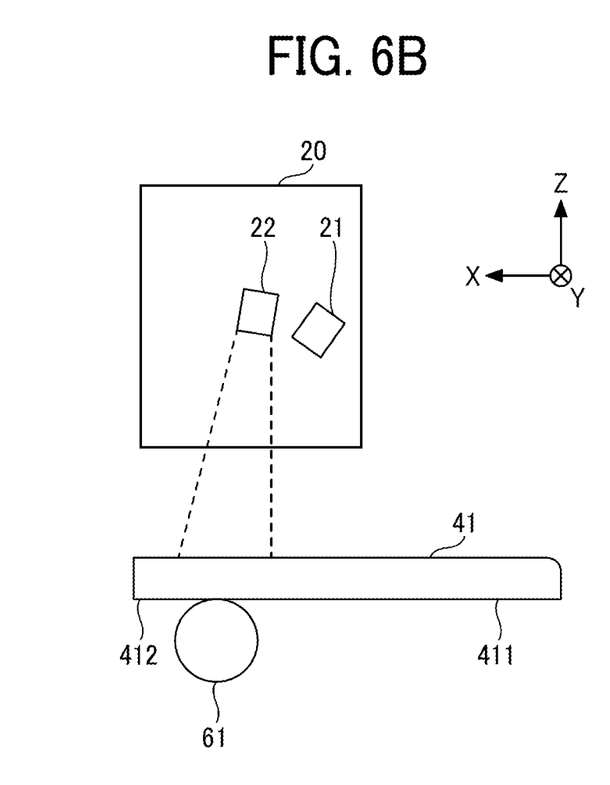

In some other examples, the color-information detection unit 20 is not moved in the +X-axis direction indicated by arrow in FIG. 5A for the emission of ultraviolet light to the white reference plate 41. For example, as illustrated in FIGS. 6A and 6B, a first roller 61 is provided in contact with the bottom surface of the white reference plate 41. For the emission of ultraviolet light from the second linear light source 22, the first roller 61 is rotated in accordance with a control signal from the controller 100 to move the white reference plate 41 in the −X-axis direction indicated by arrow in FIG. 6A. In still some other examples, for the emission of ultraviolet light from the second linear light source 22, the color-information detection unit 20 is moved in the +X-axis direction by the conveyor 30, and the first roller 61 is also rotated to move the white reference plate 41 in the −X-direction.

The conveyor 30 and the first roller 61 are examples of a position changer to change the relative position between the color-information detection unit 20 (the first linear light source 21 and the second linear light source 22) and the white reference plate 41. In other words, the position changer changes a position of the light emitter relative to the white reference portion to a first position to emit the visible light to the first irradiation area; and changes a position of the light emitter relative to the white reference portion to a second position different from the first position to emit the ultraviolet light to the second irradiation area.

Figure 7:
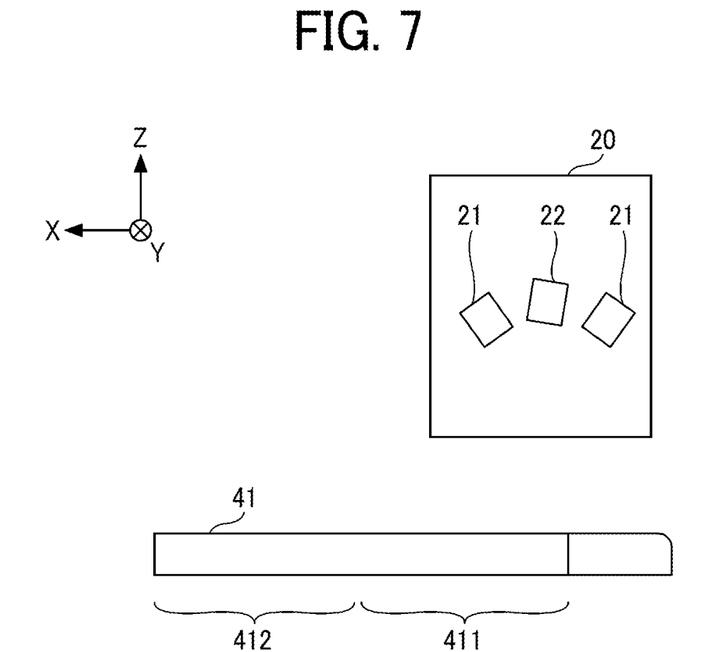
FIG. 7 is a schematic view of an end face parallel to the XZ plane of a colorimetric device according to the first embodiment.

Alternatively, as illustrated in FIG. 7, two first linear light sources 21 may be used to emit visible light.

Second Embodiment

The following describes another configuration of a white reference plate (i.e., a white reference plate 41a) for use in the calibration of the colorimetric device 10. The second embodiment differs from the first embodiment described above in the second irradiation area 412 of the white reference plate 41a.

Figure 8:
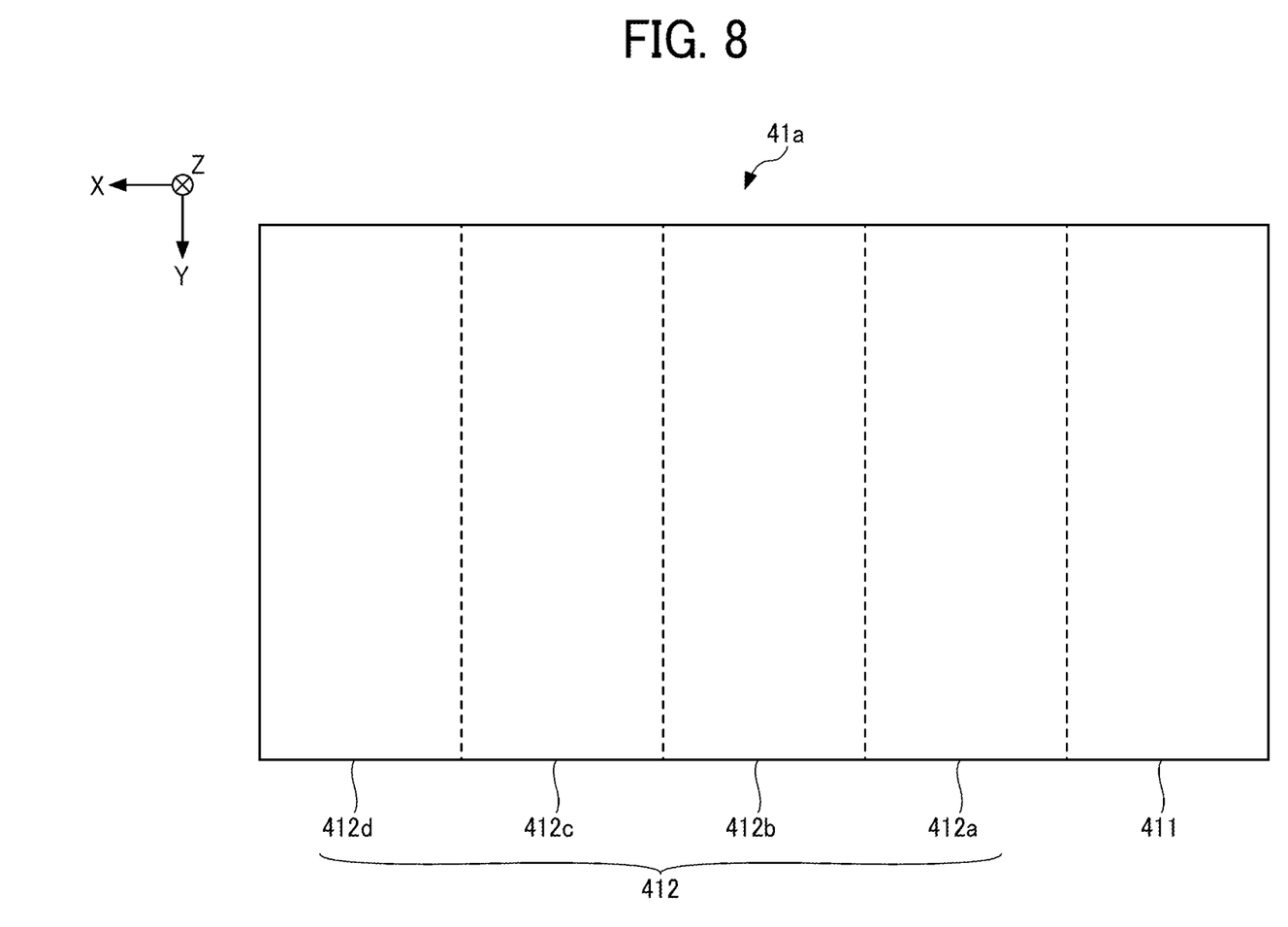
FIG. 8 is a plan view of a white reference plate according to a second embodiment.

The white reference plate 41a according to the present embodiment is described with reference to FIG. 8. FIG. 8 is a plan view of the white reference plate 41a according to the second embodiment. As illustrated in FIG. 8, the second irradiation area 412 is divided into multiple small areas 412a to 412d arranged in the X-axis direction. The number of small areas in the present embodiment is four, but is not limited thereto. Further, the arrangement of the small areas is not limited to that in FIG. 8. In other words, the second irradiation area includes multiple division areas (412a to 412d). The controller (or the circuitry) switches the multiple division areas to which the second light source emits the ultraviolet light.

In at least one embodiment, the controller 100 switches an irradiation area to be irradiated with ultraviolet light emitted from the second linear light source 22 between the small areas 412a to 412d according to switching conditions. The switching conditions include, for example, a threshold value used to determine the degree of deterioration. The threshold value is, for example, a threshold value related to a difference between spectral information of the white reference plate 41 in any desired wavelength band detected by the color-information detection unit 20 and spectral information of the white reference plate 41 preliminarily measured in the same wavelength band. In other words, the controller switches the multiple division areas (412a to 412d) in response to the calibration of the colorimetric information of white color. Alternatively, an elapsed time may be used as the switching conditions.

This configuration switches an irradiation area to be irradiated with ultraviolet light between multiple small areas into which the second irradiation area 412 is divided. This enables a lower speed of deterioration in the second irradiation area 412. Thus, a decrease in calibration accuracy using ultraviolet light in particular is successfully prevented.

Third Embodiment

Figure 9A:
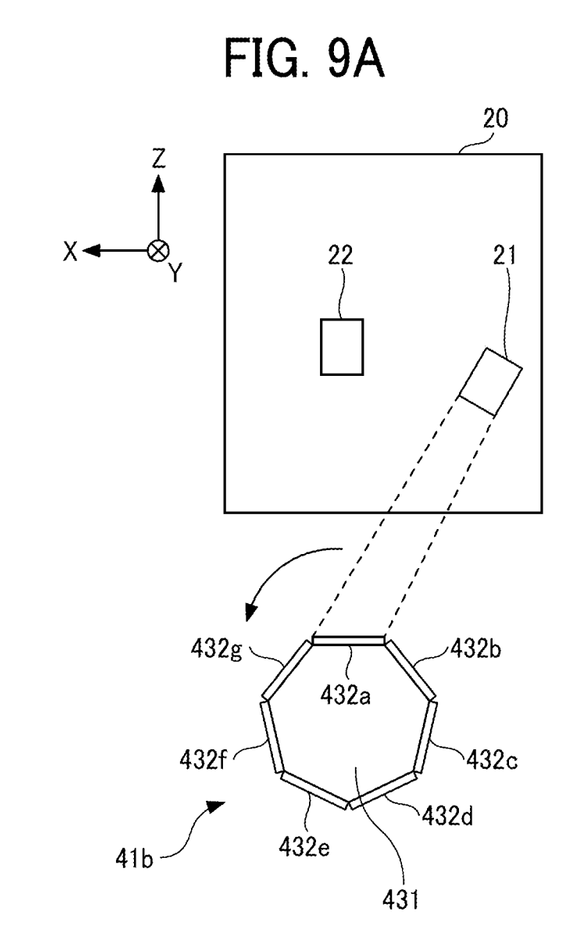
FIGS. 9A and 9B are schematic views of an end face parallel to the XZ plane of a colorimetric device according to a third embodiment.
Figure 9B:
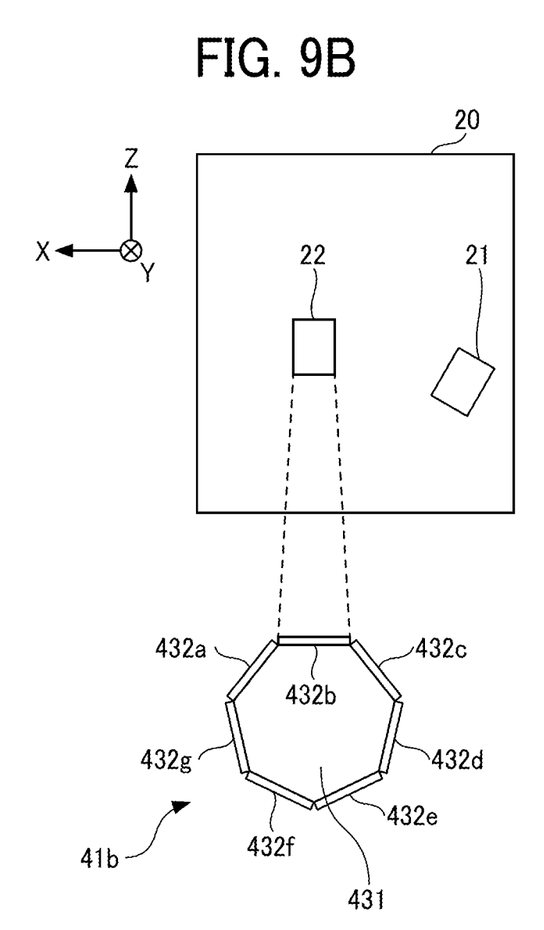

The following describes another configuration of a white reference plate (i.e., a white reference plate 41b) for use in the calibration of the colorimetric device 10 with reference to FIGS. 9A and 9B. FIGS. 9A and 9B are schematic views of an end face of a colorimetric device 10 according to the third embodiment, the end face being parallel to the XZ plane of a colorimetric device 10. Although the white reference portion is a plate-shaped member in the above-described embodiments, the white reference portion 41b according to the third embodiment has a tubular shape (e.g., a shape of a polygonal prism in FIGS. 9A and 9B).

More specifically, the white reference portion 41b includes a second roller 431 rotatably provided at a predetermined position of the colorimetric device 10, and multiple white portions 432 (e.g., white portions 432a to 432g) attached to an outer peripheral portion of the second roller 431.

As illustrated in FIG. 9A, the first linear light source 21 emits visible light to, for example, a white portion 432a as a first irradiation area. In FIG. 9B for the emission of ultraviolet light from the second linear light source 22, a white portion 432b as a second irradiation area is moved with the rotation of the second roller 431 to face the second linear light source 22. Thus, the second linear light source 22 emits ultraviolet light to the white portion 432b. The white reference portion 41b has a shape of a polygonal prism having the first irradiation area and the second irradiation area at different surfaces. The controller (i.e., the circuitry) rotates the white reference portion 41b to cause the first light source to face the first irradiation area 432a, and rotates the white reference portion 41b to cause the second light source to face the second irradiation area 432b.

In other words, rerating the second roller 431 switches the white portion to be irradiated with light from the color-information detection unit 20 from a white portion 432 to be irradiated with visible light to another white portion 432 to be irradiated with ultraviolet light. Further, rotating the second roller 431 enables switching between white portions 432 to be irradiated with ultraviolet light.

In this configuration as described above, the white portion 432 to be irradiated is switched between the emission of visible light and the emission of ultraviolet light. This prevents a reduction in the calibration accuracy of the colorimetric device 10. The number, shape, and the like of the white portions 432 are not limited to those illustrated in the drawings.

Embodiment of Image Forming Apparatus

Figure 10:
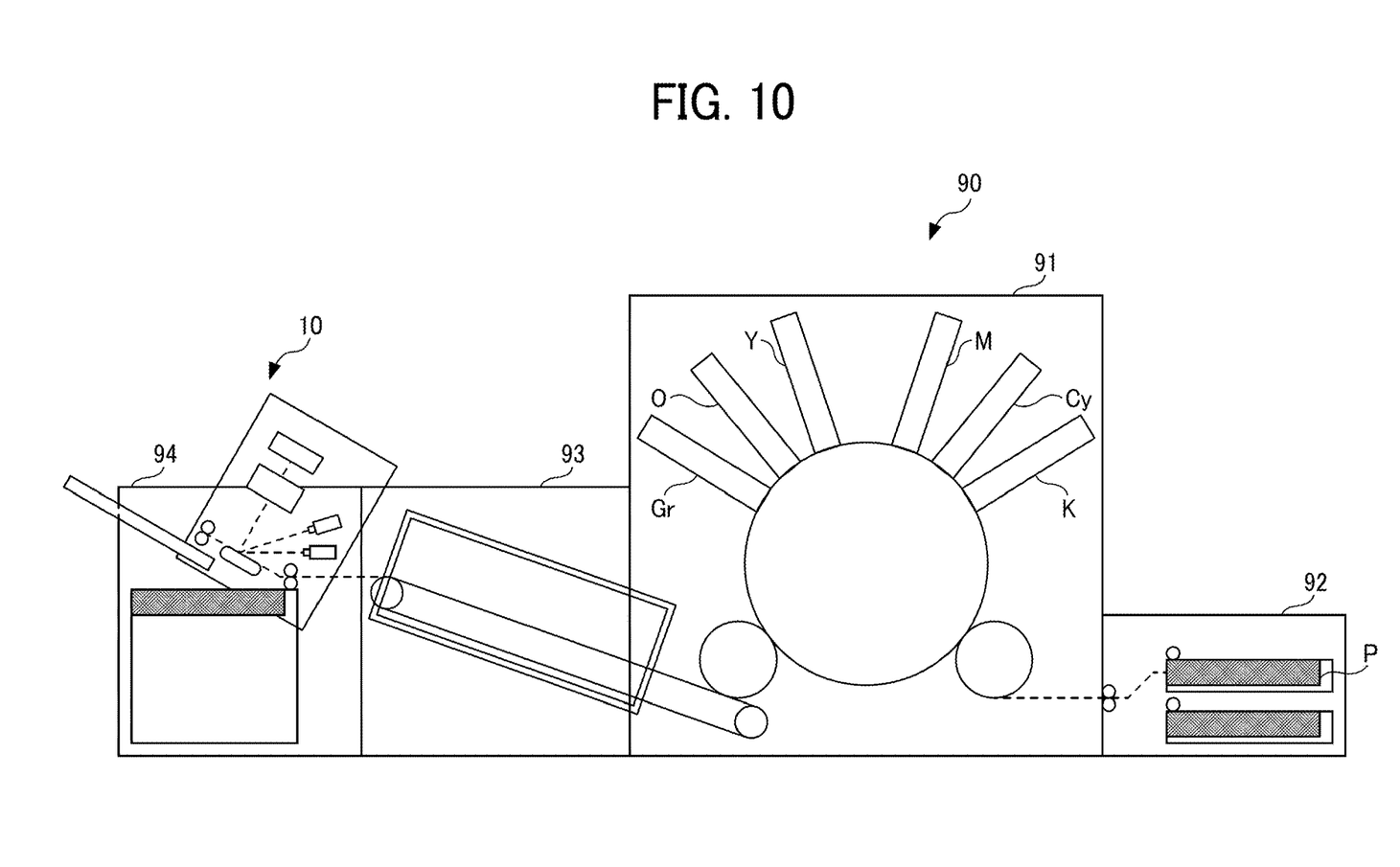
FIG. 10 is a schematic view of a configuration of an image forming apparatus incorporating a colorimetric device according to an embodiment of the present disclosure.

According to the above-described embodiment, the colorimetric device may be incorporated in an image forming apparatus as illustrated in FIG. 10. FIG. 10 is a block diagram of a configuration of an image forming apparatus 90 according to the present embodiment.

The image forming apparatus 90 is an inkjet printer including an image former 91, a sheet feeder 92, a dryer 93, and a sheet ejector 94. The colorimetric device 10 described above is incorporated in, for example, the sheet ejector 94 of the image forming apparatus 90. The image forming apparatus 90 incorporating the colorimetric device 10 is not limited to the inkjet printer, and may be an electrophotographic printer or the like.

The embodiments of the present invention have been described above. However, the present invention is not limited to the above-described embodiments, and various modifications and improvements can be made within the scope of the present invention.

Aspects of the present invention are as follows, for example.

Aspect 1

A colorimetric device (10) includes: a white reference portion (41) having: a first irradiation area (411); and a second irradiation area (412) different from the first irradiation area (411); a light emitter (21, 22) including: a first light source (21) configured to emit visible light to the first irradiation area (411); and a second light source (22) configured to emit ultraviolet light to the second irradiation area (412); a sensor (24) configured to detect the visible light reflected from the first irradiation area (411) and the ultraviolet light reflected from the second irradiation area (412); and a processor (100) configured to: measure colorimetric information of an object; and calibrate the colorimetric information of the object based on the visible light and the ultraviolet light detected by the sensor.

Aspect 2

In the colorimetric device (10) according to Aspect 1, the first light source (21) emits the visible light to the second irradiation area (412), and the second light source (22) emits the ultraviolet light to the second irradiation area (412).

Aspect 3

The colorimetric device (10) according to Aspect 1 or 2, further includes a position changer (30;61) configured to: change a position of the light emitter (21, 22) relative to the white reference portion (41) to a first position to emit the visible light to the first irradiation area (411); and change a position of the light emitter (21, 22) relative to the white reference portion (41) to a second position different from the first position to emit the ultraviolet light to the second irradiation area (412).

Aspect 4

In the colorimetric device (10) according to any one of Aspect 1 to Aspect 3, the white reference portion (41b) has a shape of a polygonal prism having the first irradiation area and the second irradiation area at different surfaces, and the processor (100) is further configured to: rotate the white reference portion (41b) to cause the first light source (21) to face the first irradiation area (432a); and rotate the white reference portion (41b) to cause the second light source (22) to face the second irradiation area (432b).

Aspect 5

In the colorimetric device (10) according to any one of Aspect 1 to Aspect 4, the second irradiation area includes multiple division areas (412a to 412d), and the processor (100) further switches the multiple division areas (412a to 412d) to which the second light source emits the ultraviolet light.

Aspect 6

In the colorimetric device (10) according to Aspect 5, the processor (100) further switches the multiple division areas (412a to 412d) based on a degree of deterioration of each of the multiple division areas.

Aspect 7

An image forming apparatus (90) includes: the colorimetric device (10) according to any one of Aspect 1 to Aspect 6; and an image former (91) calibrated by the colorimetric device, the image former configured to form an image on the object.

Aspect 8

A calibration method performed by a colorimetric device includes: emitting visible light to a first irradiation area of a white reference portion; emitting ultraviolet light to a second irradiation area of the white reference portion, the second irradiation area different from the first irradiation area; detecting the visible light reflected from the first irradiation area; detecting the ultraviolet light reflected from the second irradiation area; calibrating colorimetric information of an object based on the visible light and the ultraviolet light after the detecting the visible light and the detecting the ultraviolet light; and measuring the colorimetric information of an object after the calibrating.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A colorimetric device comprising:
   a white reference portion having:
      a first irradiation area; and
      a second irradiation area different from the first irradiation area;
   a light emitter including:
      a first light source configured to emit visible light to the first irradiation area; and
      a second light source configured to emit ultraviolet light to the second irradiation area;
   a sensor configured to detect the visible light reflected from the first irradiation area and the ultraviolet light reflected from the second irradiation area; and
   circuitry configured to:
   measure colorimetric information of an object; and
   calibrate the colorimetric information of the object based on the visible light and the ultraviolet light detected by the sensor.

2. The colorimetric device according to claim 1,
   wherein the first light source emits the visible light to the second irradiation area, and
   the second light source emits the ultraviolet light to the second irradiation area.

3. The colorimetric device according to claim 1, further comprising a position changer configured to:
   change a position of the light emitter relative to the white reference portion to a first position to emit the visible light to the first irradiation area; and
   change a position of the light emitter relative to the white reference portion to a second position different from the first position to emit the ultraviolet light to the second irradiation area.

4. The colorimetric device according to claim 1,
   wherein the white reference portion has a shape of a polygonal prism having the first irradiation area and the second irradiation area at different surfaces, and
   the circuitry is further configured to:
   rotate the white reference portion to cause the first light source to face the first irradiation area; and
   rotate the white reference portion to cause the second light source to face the second irradiation area.

5. The colorimetric device according to claim 1,
   wherein the second irradiation area includes multiple division areas, and
   the circuitry further switches the multiple division areas to which the second light source emits the ultraviolet light.

6. The colorimetric device according to claim 5,
   wherein the circuitry further switches the multiple division areas based on a degree of deterioration of each of the multiple division areas.

7. An image forming apparatus comprising:
   the colorimetric device according to claim 1; and
   an image former calibrated by the colorimetric device, the image former configured to form an image on the object.

8. A calibration method performed by a colorimetric device, the method comprising:
   emitting visible light to a first irradiation area of a white reference portion;
   emitting ultraviolet light to a second irradiation area of the white reference portion, the second irradiation area different from the first irradiation area;
   detecting the visible light reflected from the first irradiation area;
   detecting the ultraviolet light reflected from the second irradiation area;
   calibrating colorimetric information of an object based on the visible light and the ultraviolet light after the detecting the visible light and the detecting the ultraviolet light; and
   measuring the colorimetric information of an object after the calibrating.

* * * * *